US011680890B2

United States Patent
Yaniv et al.

(10) Patent No.: US 11,680,890 B2
(45) Date of Patent: Jun. 20, 2023

(54) REAL-TIME MITOCHONDRIAL DIMENSION MEASUREMENTS

(71) Applicant: TECHNION RESEARCH & DEVELOPMENT FOUNDATION LIMITED, Haifa (IL)

(72) Inventors: Yael Yaniv, Haifa (IL); Joseph M. Leichner, Nof Ayalon (IL); Evgene Konyukhov, Nesher (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 127 days.

(21) Appl. No.: 17/047,814

(22) PCT Filed: Apr. 17, 2019

(86) PCT No.: PCT/IL2019/050444
§ 371 (c)(1),
(2) Date: Oct. 15, 2020

(87) PCT Pub. No.: WO2019/202599
PCT Pub. Date: Oct. 24, 2019

(65) Prior Publication Data
US 2021/0110546 A1    Apr. 15, 2021

Related U.S. Application Data

(60) Provisional application No. 62/658,662, filed on Apr. 17, 2018.

(51) Int. Cl.
*G06T 7/62* (2017.01)
*G06V 20/69* (2022.01)
(Continued)

(52) U.S. Cl.
CPC ....... *G01N 15/1475* (2013.01); *G06T 7/0016* (2013.01); *G06T 7/62* (2017.01);
(Continued)

(58) Field of Classification Search
CPC ........ G01N 15/1475; G01N 2015/1006; G06T 2207/10016; G06T 2207/20056;
(Continued)

(56) References Cited

U.S. PATENT DOCUMENTS 8,131,112 B1 * 3/2012 Gourley ............... G06T 7/0012
382/280
8,472,752 B1 * 6/2013 Gourley ............... G06T 7/0012
382/280

(Continued)

OTHER PUBLICATIONS

Aon et al "Mitochondrial Oscillations in Physiology and Pathophysiology" (Year: 2008).*

(Continued)

*Primary Examiner* — Tsung Yin Tsai
(74) *Attorney, Agent, or Firm* — The Roy Gross Law Firm, LLC; Roy Gross

(57) ABSTRACT

A method comprising: receiving an image stream of a mammalian cardiac muscle cell; defining or having defined a region of interest (ROI) within said cell; calculating a fast Fourier transform (FFT) of said ROI; detecting peaks in said FFT; and determining at least one of sarcomere length, mitochondrial length, and mitochondrial width, based, at least in part, in said detected peaks.

17 Claims, 6 Drawing Sheets

(51) Int. Cl.
G06V 10/42       (2022.01)
G01N 15/14       (2006.01)
G06T 7/00        (2017.01)

(52) U.S. Cl.
CPC .......... *G06V 10/431* (2022.01); *G06V 20/695* (2022.01); *G06T 2207/10016* (2013.01); *G06T 2207/20056* (2013.01); *G06T 2207/30004* (2013.01)

(58) Field of Classification Search
CPC ......... G06T 2207/30004; G06T 7/0016; G06T 7/62; G06V 10/431; G06V 20/695
See application file for complete search history.

(56) References Cited

U.S. PATENT DOCUMENTS

| | | | | |
|---|---|---|---|---|
| 2002/0027649 | A1* | 3/2002 | Chudner | G01N 21/35 250/341.1 |
| 2012/0219985 | A1* | 8/2012 | Yoon | G01N 21/6458 977/894 |
| 2014/0193892 | A1* | 7/2014 | Mohan | G01N 15/1434 435/287.2 |
| 2018/0088051 | A1* | 3/2018 | Georgakoudi | G06T 7/20 |
| 2021/0110546 | A1* | 4/2021 | Yaniv | G06V 20/695 |

OTHER PUBLICATIONS

Kurz et al "Spatio-temporal oscillations of individual mitochondria in cardiac myocytes reveal modulation of synchronized mitochondrial clusters" (Year: 2010).*

YaniV et al "Analysis of Mitochondrial 3D-Deformation in Cardiomyocytes during Active Contraction Reveals Passive Structural Anisotropy of Orthogonal Short Axes" (Year: 2011).*

Shami et al "Three-dimensional ultrastructure of giant mitochondria in human non-alcoholic fatty liver disease" (Year: 2021).*

Leichner,J.M., Konyukhov, E., Kamoun, D. & Yaniv,Y. Real time mitochondrial dimension measurements. Journal of Biological Methods, 2019;6(1):e111. Retrieved Aug. 31, 2021; DOI: 10.14440/jbm.2019.262.

Peterson P., Kaida, M.,& Vendelin, M. Real-time determination of sarcomere length of a single cardiomyocyte during contraction. Am J Physiol Cell Physiol. Mar. 2013;304(6):C519-31. Epub Dec. 19, 2012. Retrieved Aug. 31, 2021; doi:10.1152/ajpcell.00032.2012.

Tedeschi, H. & Harris, D.L. Some observations on the photometric estimation of mitochondrial volume. Biochim Biophys Acta. May 1958;28(2):392-402. Retrieved Aug. 31, 2021; DOI: 10.1016/0006-3002(58)90487-6.

Juhaszova, M. et al. Glycogen synthase kinase-3beta mediates convergence of protection signaling to inhibit the mitochondrial permeability transition pore. J Clin Invest. Jun. 2004;113(11):1535-49. Retrieved Aug. 31, 2021 from: https://doi.org/10.1172/JCI19906.

Yaniv, Y. et al. (2010). Matching ATP supply and demand in mammalian heart: in vivo, in vitro, and in silico perspectives. Annals of the New York Academy of Sciences, 1188, 133-142. Retrieved Aug. 31, 2021; doi:10.1111/i.1749-6632.2009.05093.x.

Safiulina, Dzhamilja, et al. "Loss of mitochondrial membrane potential is associated with increase in mitochondrial volume: physiological role in neurones." Journal of cellular physiology 206.2 (2006): 347-353. Retrieved Aug. 31, 2021; DOI: 10.1002/jcp.20476.

Hayashi, T. et al. Three-dimensional electron microscopy reveals new details of membrane systems for Ca2+ signaling in the heart. J Cell Sci. 2009;122(Pt 7):1005-1013. Retrieved Aug. 31, 2021; doi:10.1242/jcs.028175.

Yaniv, Y. et al., (2011) Analysis of Mitochondrial 3D-Deformation in Cardiomyocytes during Active Contraction Reveals Passive Structural Anisotropy of Orthogonal Short Axes. PLoS ONE 6(7): e21985. Retrieved Aug. 31, 2021; doi: 10.1371/journal.pone.0021985.

PCT International Search Report for International Application No. PCT/IL2019/050444, dated Jul. 30, 2019, 2pp.

PCT Written Opinion for International Application No. PCT/IL2019/050444, dated Jul. 30, 2019, 5pp.

PCT international Preliminary Report on Patentability for International Application No. PCT/IL2019/050444, dated Oct. 20, 2020, 6pp.

* cited by examiner

US 11,680,890 B2

REAL-TIME MITOCHONDRIAL DIMENSION MEASUREMENTS

CROSS-REFERENCE TO RELATED APPLICATIONS

This application is a National Phase of PCT Patent Application No. PCT/IL2019/050444 having International filing date of Apr. 17, 2019, which claims the benefit of priority of U.S. Provisional Patent Application No. 62/658,662 filed Apr. 17, 2018, The contents of the above applications are incorporated herein by reference in its their entirety.

BACKGROUND

The invention relates to the field of automated image analysis.

Mitochondrial volume is associated with several processes in the cell, for example, cellular energy production, reactive oxygen species (ROS) formation, cytochrome c release in the process of apoptosis, and force development by the myofibrils. Thus, measurements of mitochondrial dimension can be useful for exploring how the cell maintains its function during normal and abnormal conditions, and how changes in mitochondrial dimensions are associated with different cardiac diseases.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method comprising receiving an image stream of a live mammalian cell; defining or having defined a region of interest (ROI) within said cell; calculating a fast Fourier transform (FFT) of said ROI; detecting peaks in said FFT; and determining at least one of sarcomere length, mitochondrial length, and mitochondrial width, based, at least in part, on said detected peaks.

There is also provided, in an embodiment, a system comprising: at least one hardware processor; and a non-transitory computer-readable storage medium having stored thereon program instructions, the program instructions executable by the at least one hardware processor to receive an image stream of a live mammalian cell; define or having defined a region of interest (ROI) within said cell; calculate a fast Fourier transform (FFT) of said ROI; detect peaks in said FFT; and determine at least one of sarcomere length, mitochondrial length, and mitochondrial width, based, at least in part, on said detected peaks.

There is further provided, in an embodiment, a computer program product comprising a non-transitory computer-readable storage medium having program instructions embodied therewith, the program instructions executable by at least one hardware processor to: receive an image stream of a live mammalian cell; define or having defined a region of interest (ROI) within said cell; calculate a fast Fourier transform (FFT) of said ROI; detect peaks in said FFT; and determine at least one of sarcomere length, mitochondrial length, and mitochondrial width, based, at least in part, on said detected peaks.

In some embodiments, said ROI comprises (i) at least one substantially longitudinal line and (ii) at least one substantially transverse line, relative to a longitudinal dimension of said cell.

In some embodiments, said calculating comprises determining a length of each of said longitudinal and transverse lines.

In some embodiments, said FFT is calculated with respect to each image frame of said image stream.

In some embodiments, said determining of said sarcomere length is based on said peaks detected within the frequency range of 1.8 µm-2.2 µm.

In some embodiments, said determining of said mitochondrial length and mitochondrial width is based on said peaks detected within the frequency range of 0.7 µm-1.1 µm.

In some embodiments, said mammalian cell is a cardiac muscle cell.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 5A-6B illustrate experimental results.

DETAILED DESCRIPTION

Figure 1:
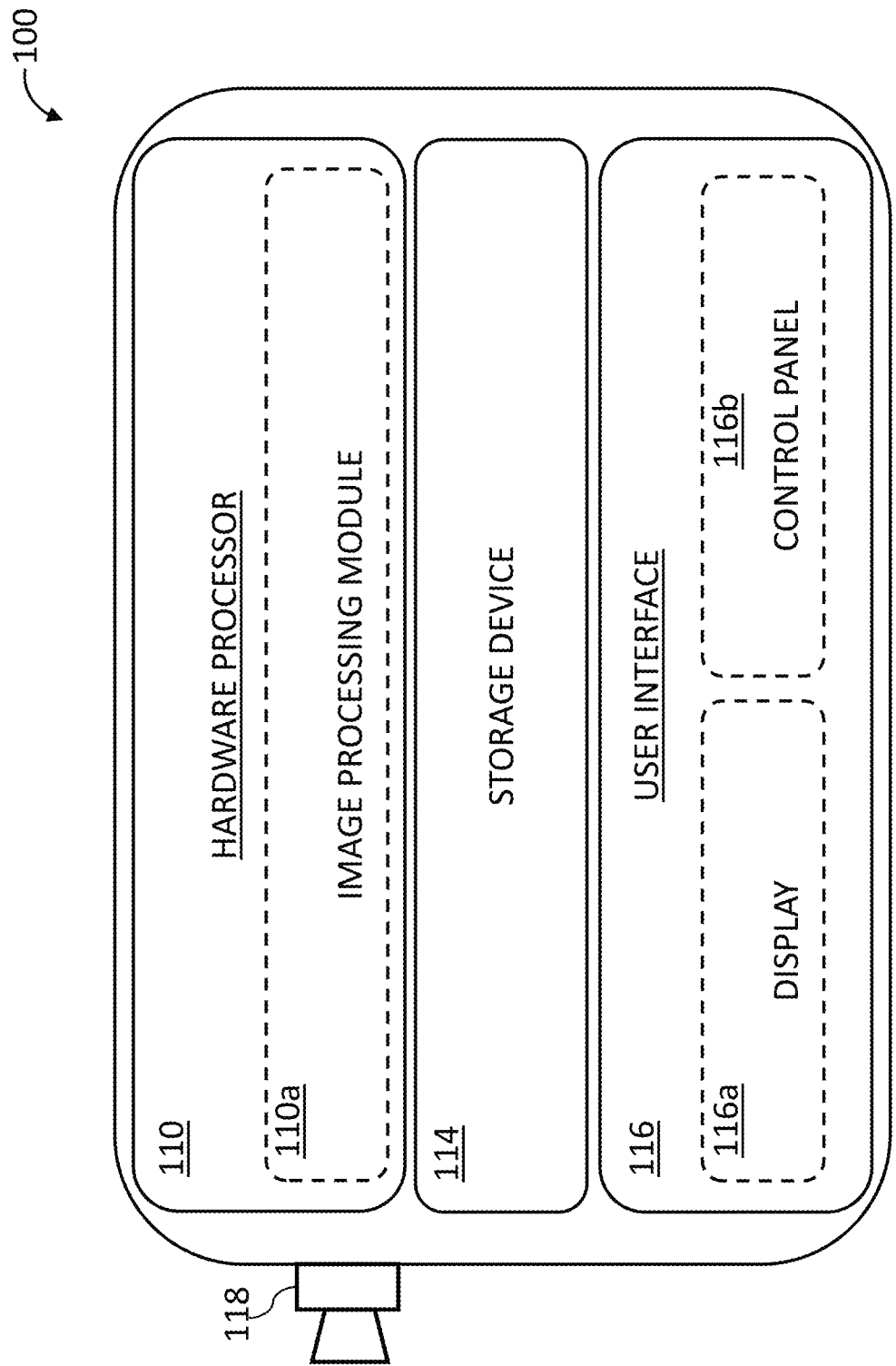
FIG. 1 is a block diagram of an exemplary system for analyzing steady state sarcomere length (SL) and mitochondrial dimension dynamics from cardiomyocytes isolated from a mammal, in accordance with some embodiments.

Disclosed herein are a system, method, and computer program product for analyzing steady state sarcomere length (SL) and mitochondrial dimension dynamics from cardiomyocytes isolated from different mammals. In some embodiments, the present method provides for analyzing real-time data from different microscope systems, as well as for post-processing analysis of existing data.

Different techniques have been suggested to measure mitochondrial dimensions. The most popular technique is light scattering. However, this technique provides information only for isolated mitochondria, which are an inferior physiological model to that of isolated cells. Mitochondrial potential dye can be used to image mitochondrial dimensions, but this technique is applicable for short imaging only; long imaging is not possible because the potential dye produces reactive oxygen species (ROS) in the cell. Moreover, small deformations of the mitochondria in response to cell contraction are below the diffraction limit. Finally, while electron microscopy can image the cell with the necessary resolution, the cell must be fixed, and thus no functional information about the cell can be obtained.

A recent microscopy technique makes use of the tight packing of the mitochondria between the sarcomeres in the cardiac cell and the fact that there are two mitochondria per sarcomere. In this technique, laser diffraction without dyes is used to measure the steady state sarcomere length (SL) and the mitochondrial dimensions in situ. This technique was further developed so that the SL and mitochondrial dimension dynamics can now be quantified in response to light pacing. Although this technique allows mitochondrial dimension dynamics to be quantified in situ for the first time, the analysis can be done post-processing and only for short time recordings. Because the cells can only be analyzed off-line, the success rate is very low if the cell undergoes drug manipulation or other manipulations (e.g., stretching). Moreover, if a large population of cells is scanned, off-line processing slows the process. Finally, because no public program is available to analyze the mitochondrial dimensions, this method is not widely used.

Accordingly, in some embodiments, the present disclosure provides for analyzing and measuring in real-time changes in dimensions of sarcomere and mitochondria in-situ (e.g., via live video stream), as well as for conducting a later offline analysis (e.g., via a pre-recorded video stream). A potential advantage of the present disclosure is, therefore, in that it provides for an accurate and efficient tool for studying cardiac energetics, mechanics, and the underlying mechanisms of cardiac diseases.

In experimental results, the present system was shown to successfully find peaks in the FFT graphs created from, e.g., a user-selected ROI in images of either rat or rabbit ventricular cells. These peaks are used to calculate the dimensional changes of the sarcomere and mitochondria. The present method is designed for the case of ventricular myocytes, where two mitochondria alternate between a sarcomere. However, the present system may be adapted for other cell types, based on known mitochondria patterns.

FIG. 1 is a block diagram of an exemplary system 100 for analyzing steady state sarcomere length (SL) and mitochondrial dimension dynamics from cardiomyocytes isolated from a mammal. System 100 as described herein is only an exemplary embodiment of the present invention, and in practice may have more or fewer components than shown, may combine two or more of the components, or a may have a different configuration or arrangement of the components. The various components of system 100 may be implemented in hardware, software or a combination of both hardware and software. In various embodiments, system 100 may comprise a dedicated hardware device or may form an addition to or extension of an existing medical device.

In some embodiments, system 100 may comprise a hardware processor 110, memory storage device 114, user interface 116, and imaging system 118. System 100 may store in a non-volatile memory thereof, such as storage device 114, software instructions or components configured to operate a processing unit (also "hardware processor," "CPU," or simply "processor), such as hardware processor 110. In some embodiments, the software components may include an operating system, including various software components and/or drivers for controlling and managing general system tasks (e.g., memory management, storage device control, power management, etc.) and facilitating communication between various hardware and software components.

In some embodiments, non-transient computer-readable storage device 114 (which may include one or more computer readable storage mediums) is used for storing, retrieving, comparing, and/or annotating captured frames and or video sequences. Image frames and video sequences may be stored on storage device 114 based on one or more attributes, or tags, such as a time stamp, a user-entered label, or the result of an applied image processing method indicating the association of the frames, to name a few.

The software instructions and/or components operating hardware processor 110 may include instructions for receiving and analyzing video sequences captured by imaging system 118. For example, hardware processor 110 may comprise image processing module 110a, which receives one or more images and/or image streams from imaging system 118 and applies one or more image processing algorithms thereto. In some embodiments, image processing module 110a comprises one or more algorithms configured to perform object recognition and classification in images captured by imaging system 118, using any suitable image processing or feature extraction technique. For some embodiments, image processing module 110a can simultaneously receive and switch between multiple input image streams to multiple output devices while providing image stream processing functions on the image streams. The incoming image streams may come from various medical or other imaging devices. The image streams received by the image processing module 110a may vary in resolution, frame rate (e.g., between 15 and 35 frames per second), format, and protocol according to the characteristics and purpose of their respective source device. Depending on the embodiment, the image processing module 110a can route image streams through various processing functions, or to an output circuit that sends the processed image stream for presentation, e.g., on a display 116a, to a recording system, across a network, or to another logical destination. Image processing module 110a may also facilitate logging or recording operations with respect to an image stream. According to some embodiments, the image processing module 110a enables recording of the image stream with a voice-over or a bookmark, or capturing of frames from an image stream (e.g., drag-and-drop a frame from the image stream to a window). Some or all of the functionality of the image processing module 110a may be facilitated through an image stream recording system or an image stream processing system.

In some embodiments, a user interface 116 of system 100 comprises a display monitor 116a for displaying images, and a control panel 116b for controlling system 100. In some variations, display 116a may be used as a viewfinder and/or a live display for either still and/or video image acquisition by imaging system 118. The image stream presented by display 116a may be one originating from imaging system 118. Display 116a may be a touch-sensitive display. The touch-sensitive display is sometimes called a "touch screen" for convenience, and may also be known as or called a touch-sensitive display system. Touch-sensitive display may be configured to detect commands relating to activating or deactivating particular functions of system 100.

Imaging system 118 is broadly defined as any device that captures images and represents them as data. Imaging devices may be optic-based, but may also include microscopy devices, depth sensors, radio frequency imaging, ultrasound imaging, infrared imaging, and the like. In some embodiments, imaging system 118 may be configured to detect RGB (red-green-blue) spectral data. In other embodiments, imaging system 118 may be configured to detect at least one of monochrome, ultraviolet (UV), near infrared (NIR), and short-wave infrared (SWIR) spectral data. In some embodiments, imaging system 118 comprises a digital imaging sensor selected from the group consisting of silicon-based detectors, complementary metal-oxide-semiconductor (CMOS), charge-coupled device (CCD), Indium gallium arsenide (InGaAs), and polarization-sensitive sensor element. In some embodiments, imaging system 118 is configured to capture images of a tissue sample in vivo or in situ, along a direct optical path from the tissue sample. In other embodiments, imaging system 118 is coupled to a light guide, e.g., a fiber optic light guide, for directing a reflectance and/or fluorescence from the tissue sample to imaging system 118. Imaging system 118 may further comprise, e.g., zoom, magnification, and/or focus capabilities. Imaging system 118 may also comprise such functionalities as color filtering, polarization, and/or glare removal, for optimum visualization. Imaging system 118 may further include an image stream recording system configured to receive and store a recording of an image stream received, processed, and/or presented through system 100.

System 100 may further comprise, e.g., light collection optics; beam splitters and dichroic mirrors to split and direct a desired portion of the spectral information towards more than one imaging device; and/or multiple optical filters having different spectral transmittance properties, for selectively passing or rejecting passage of radiation in a wavelength-, polarization-, and/or frequency-dependent manner.

In some embodiments, system 100 includes one or more user input control devices, such as a physical or virtual joystick, mouse, and/or click wheel. In other variations, system 100 comprises one or more of a peripherals interface, RF circuitry, audio circuitry, a microphone, an input/output (I/O) subsystem, other input or control devices, optical or other sensors, and an external port. System 100 may also comprise one or more sensors, such a proximity sensors and/or accelerometers. Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments.

System 100 described herein is only an exemplary embodiment of the present system, and may have more or fewer components than shown, may combine two or more components, or a may have a different configuration or arrangement of the components. The various components of system 100 may be implemented in hardware, software or a combination of both hardware and software, including one or more signal processing and/or application-specific integrated circuits. In various embodiments, system 100 may comprise a dedicated hardware device, or may form an addition to or extension of an existing medical device, such as a colposcope. In addition, aspects of the present system which can be implemented by computer program instructions, may be executed on a general-purpose computer, a special-purpose computer, or other programmable data processing apparatus.

Figure 2:
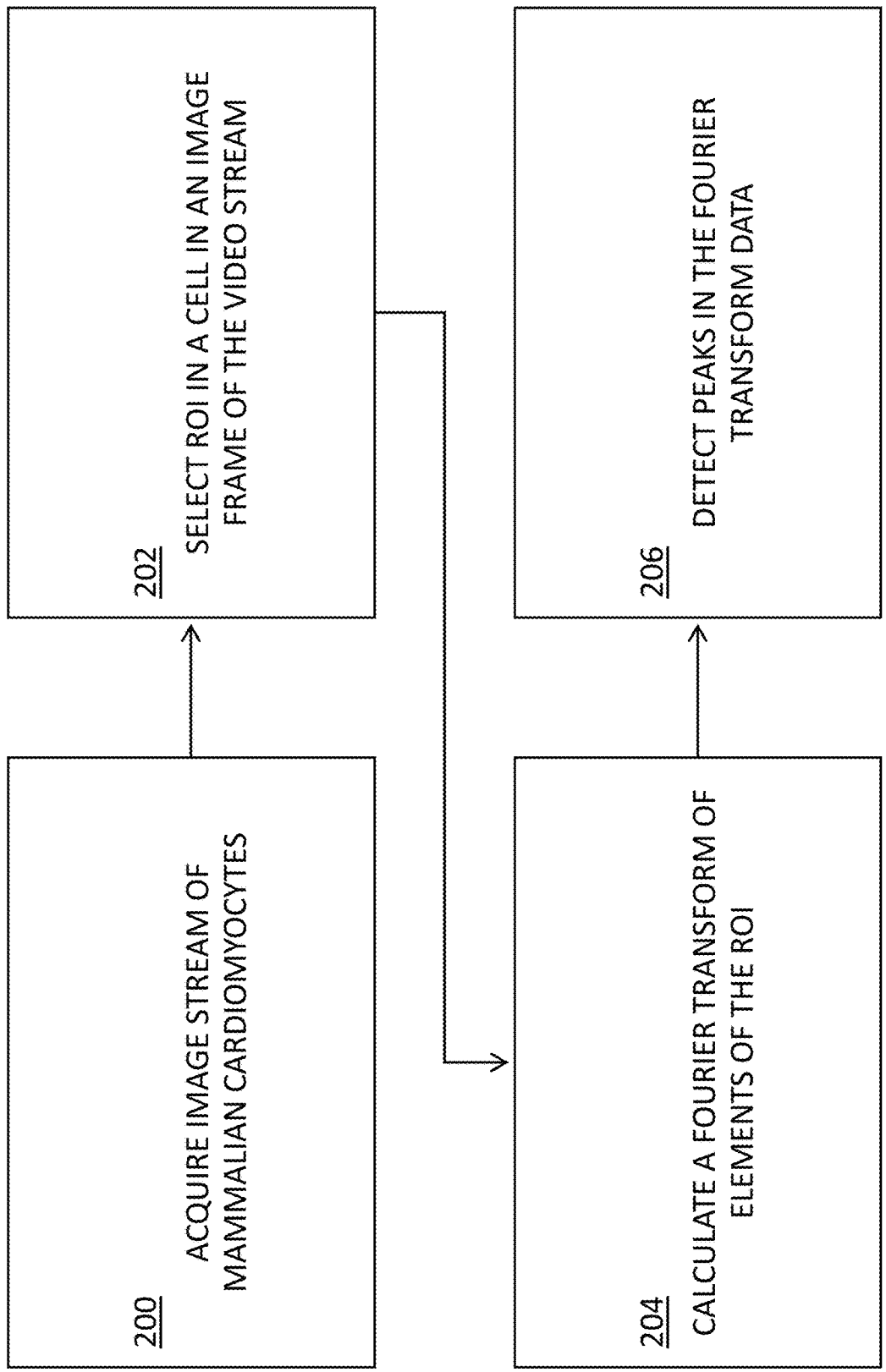
FIG. 2 is a flowchart of the functional steps of a method for analyzing steady state sarcomere length (SL) and mitochondrial dimension dynamics from cardiomyocytes isolated from a mammal, in accordance with some embodiments.

FIG. 2 is a flowchart of the functional steps in using a system, such as system 100 in FIG. 1, for analyzing steady state sarcomere length (SL) and mitochondrial dimension dynamics from cardiomyocytes isolated from a mammal.

In some embodiments, at a step 200, mammalian cardiomyocytes (i.e., cardiac muscle cells) are isolated from a mammal and imaged, e.g., using an imaging system such as imaging system 118 in FIG. 1, which may include, e.g., a microscope and/or an imaging camera. In some embodiments, the video stream may be acquired via a live feed. In some embodiments, the video stream maybe pre-recorded. In some embodiments, the video stream may be visible to a user of the system on a display, e.g., display 116a in FIG. 1.

Figure 3:
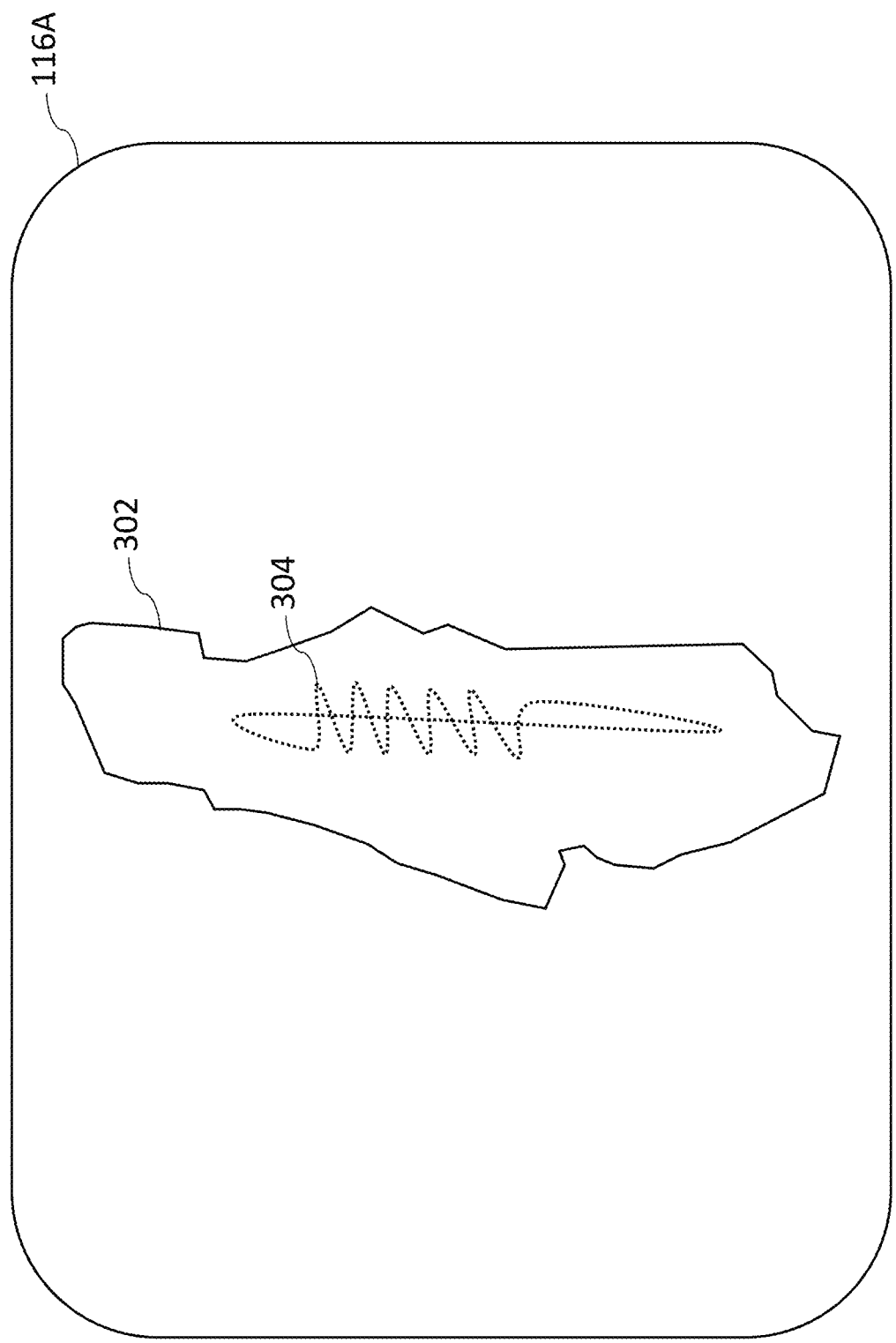
FIG. 3 illustrates a process for region-of-interest indication, in accordance with some embodiments.

In some embodiments, at a step 202, a user of system 100 may choose a region of interest (ROI) in a frame of the video stream. FIG. 3 shows an image frame of a cell 302 as displayed on, e.g., display 116a, wherein a user has selected an ROI 304. In some embodiments, ROI 304 selection may be performed by the user manually, e.g., by drawing and/or otherwise indicating a region within the boundaries of cell 302 and generally consistent with the cell shape. For example, ROI 304 may consist, e.g., an elongated line indicated along a longitudinal dimension of the imaged cell 302, intersected by a plurality of generally transverse lines along a width dimension of cell 302. Accordingly, in some embodiments, because the length of cell 302 is generally significantly longer than its width, ROI 304 should consist of a line along the length of the cell and a number of parallel lines along its width. In some embodiments, the ROI may form an entirety of the cell area, or only a portion thereof. In some embodiments, the user may first mark the single line along the length of the cell, and then mark the transverse lines along its width, while ensuring that the latter lines are selected roughly perpendicular to the line along the length. In some embodiments, the user may select as many lines along the width of the cell as desired. In some embodiments, once ROI 304 has been selected, the lines comprising ROI 304 can be moved and edited. In some embodiments, the user can select a new ROI at any time.

at a step 204, system 100 may analyze the ROI selected by the user at step 202. In some embodiments, the analysis may contain several steps. For example, image analysis module 110a may calculate a fast Fourier transform (FFT) of the ROI along the length of the cell, while taking the angle of the line as well as image zoom level into account. Accordingly, if a starting point is defined as $(x_1, y_1)$ and the end point as $(x_2, y_2)$, the element length is calculated as:

$$\text{Element Length} = \frac{\left(\frac{\text{Pixel Length}}{\text{Zoom}}\right)}{\cos\left(\tan^{-1}\left(\frac{y_2 - y_1}{x_2 - x_1}\right)\right)} \quad (1)$$

For example, if pixel size is 6.45 μm×6.45 μm and zoom level is ×60, then:

$$\text{Element Length} = \frac{\left(\frac{6.45\ \mu m}{60}\right)}{\cos\left(\tan^{-1}\left(\frac{y_2 - y_1}{x_2 - x_1}\right)\right)} \quad (2)$$

In some embodiments, the distance in frequency units between the elements of the FFT vector (df) is calculated as:

$$df = \frac{\left(\frac{1}{\text{Element Length}}\right)}{N} \quad (3)$$

where N is defined as the number of elements of the calculated FFT vector.

In some embodiments, similar calculation is done for the ROI transverse lines along the width of the cell. Because the width dimension is shorter than the length dimension, multiple lines are used for this analysis. In some embodiments, image analysis module 110a may concatenate the lines into one long line and calculate the FFT. Because the lines are close to parallel, the df of each ROI width line will be calculated separately and the average df will be used.

In some embodiments, at a step 206, once the FFTs and the corresponding dfs have been calculated, image analysis module 110a may search for two main peaks in the FFT graphs, wherein the peaks correspond to sarcomere and mitochondrial length. In some embodiments, the search will be limited to the frequency range in which these peaks are expected, e.g., 1.8 µm-2.2 µm for the sarcomere, and 0.7 µm-1.1 µm for the mitochondria. In some embodiments, this analysis maybe repeated for every frame in the video sequence.

In some embodiments, system 100 may be configured for saving and/or displaying the analyzed data from the video stream, including, e.g., the FFT, the sarcomere peaks, and the mitochondrial peaks for both length and width dimensions of the ROI.

Experimental Results

Figure 4:
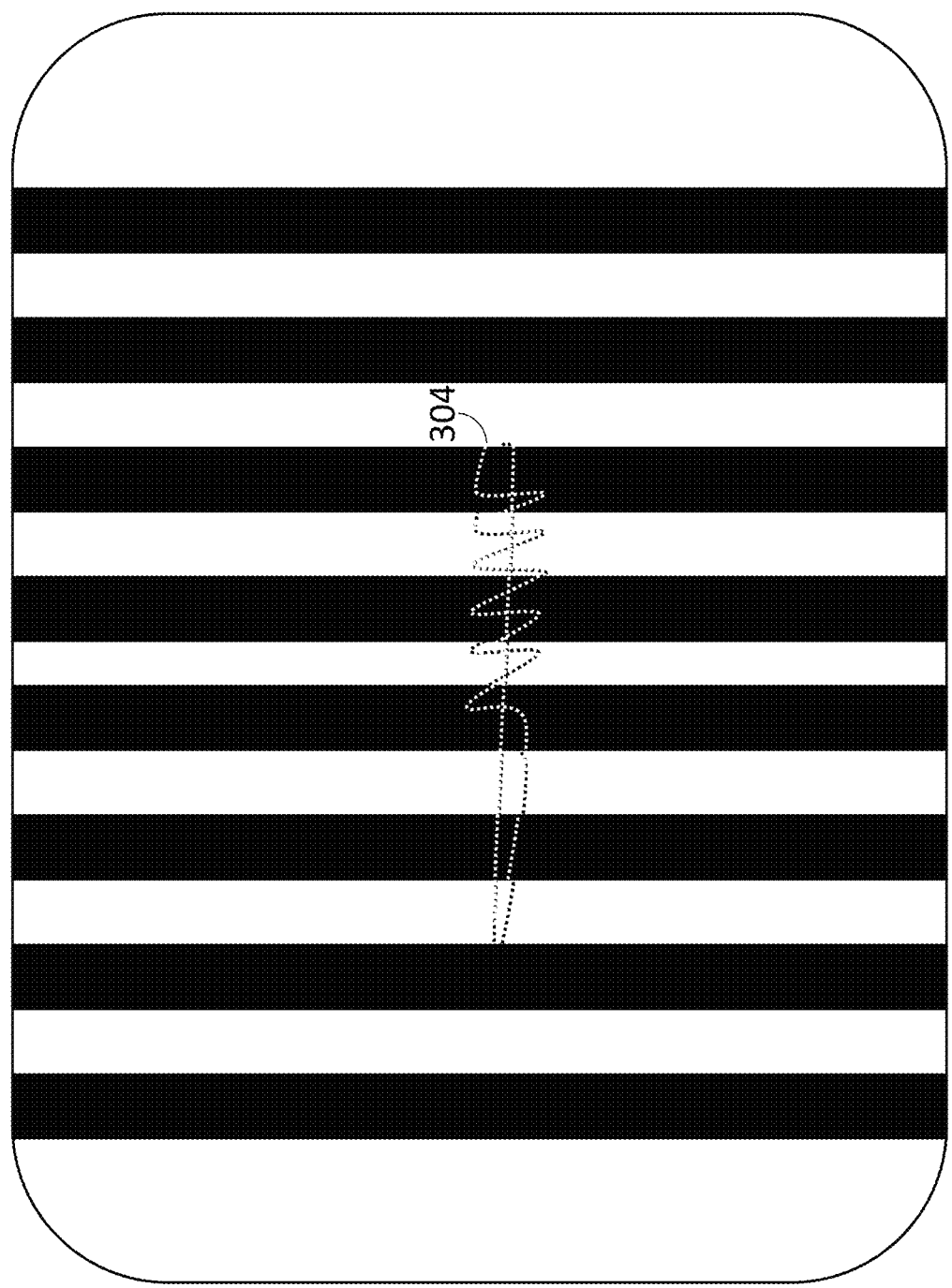
FIG. 4 illustrates a test of the present system using a generated synthetic image of repetitive stripes, in accordance with some embodiments.

The present system was tested using a generated synthetic image of repetitive stripes to simulate repetitive sarcomeres and mitochondria (FIG. 4). After ROI 304 is indicated, the first and second order FFT peaks are shown. The present system accurately recognized the distance between the lines.

Rat and rabbit cardiomyocytes were then used to test the ability of the present system to measure and analyze SL and mitochondrial dimensions of such cells. In these cardiomyocytes, the sarcomeres have a lattice-like structure and thus are ideal for our analysis.

Figure 5A:
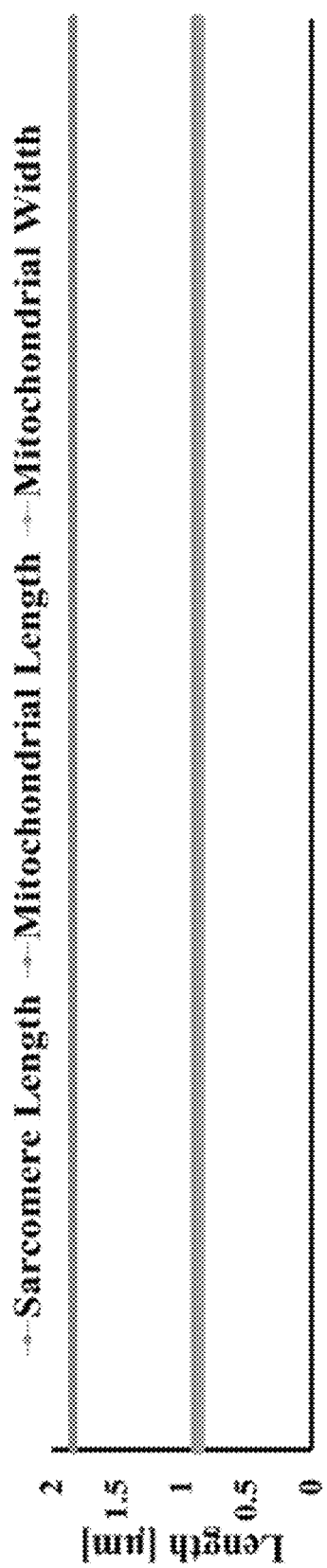
Figure 5B:
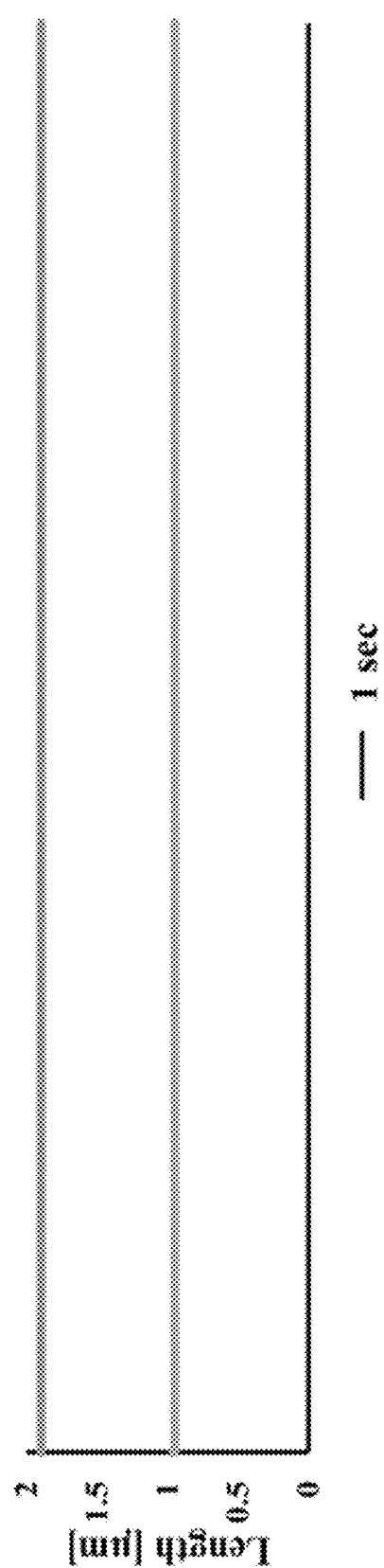

Analyzing the SL and mitochondrial length and width dimensions per frame allows calculating them vs. time. The present system is first demonstrated on rabbit cardiomyocytes. FIG. 5A presents the SL (derived from the frequency of the first harmonic peak of the long axis measurements), the mitochondrial length (derived from the frequency of the second harmonic peak of the same long axis), and mitochondrial width (derived from the frequency of the first harmonic peak of the short axis measurements) vs. time. On average 17 cells were measured, all of which showed clear SL and mitochondrial length and width during quiescent mode. The same method was tested on rat cardiomyocytes. FIG. 5B presents the SL, the mitochondrial length, and the mitochondrial width vs. time. On average, 13 cells were measured, all of which showed clear SL and mitochondrial length and width during quiescent mode.

Figures 6A, 6B:
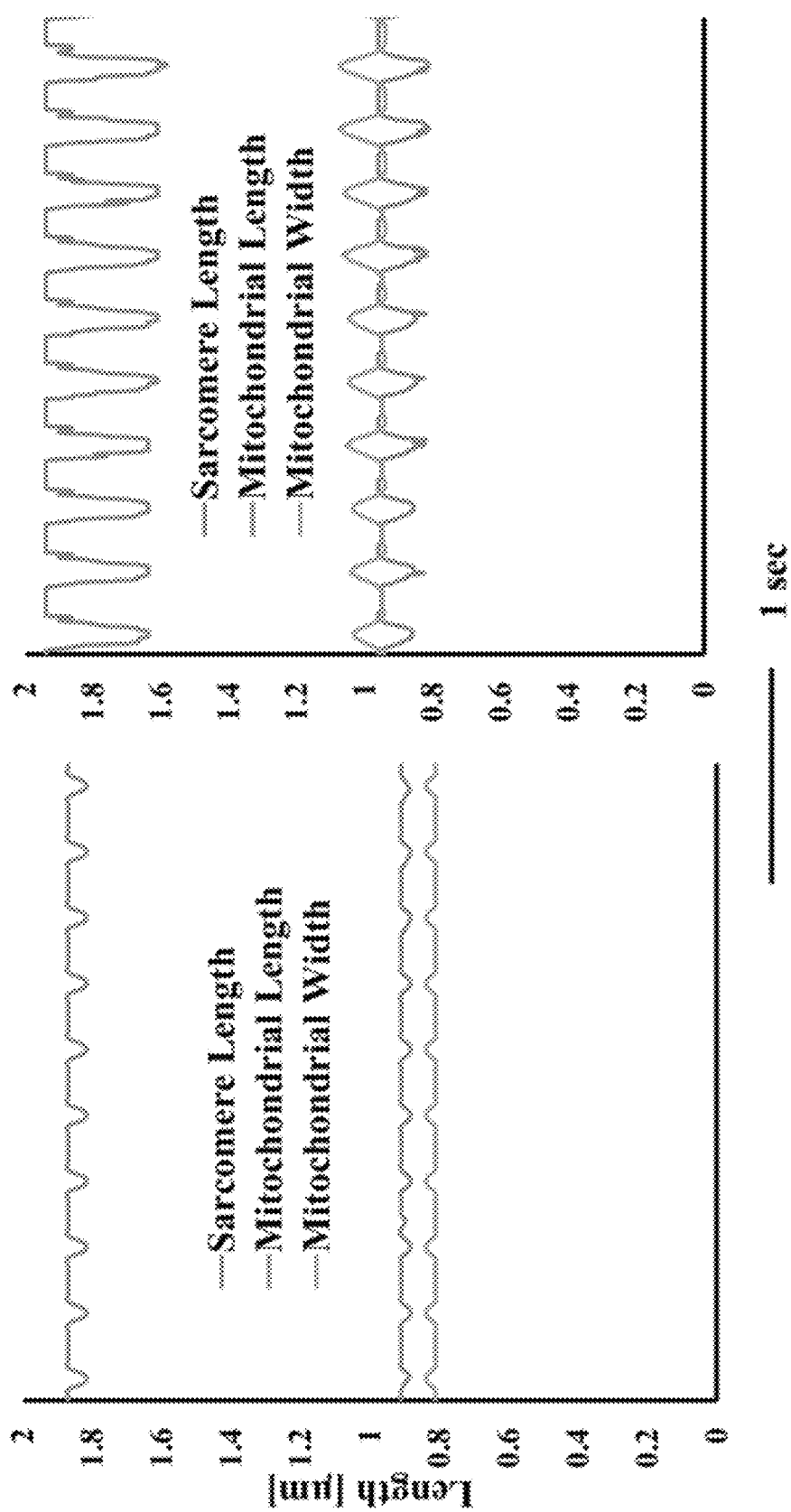

Finally, the present system was shown to be able to find SL and mitochondrial dimensions during contraction. FIGS. 6A-6B show SL and mitochondrial contraction-relaxation cycles during steady-state 3 Hz electrical stimulation, in rabbits (6A) and rats (6B). Note that the SL shortens together with the mitochondrial length while the mitochondrial width expands, as previously documented. Although the steady state sarcomere and mitochondrial dimensions were measured in 17 rabbit and 13 rat cells, only 6 steady-state sarcomere and mitochondrial contractions could be traced in each cell type. These results were compared with regard to changes in SL and mitochondrial length for rat cells that were electrically simulated at 3 Hz to results published using the same algorithm (not the same method) at a 1 Hz stimulation rate. Using either electrical stimulation rate, the SL shortened together with the mitochondrial length while the mitochondrial width expanded. In response to a higher electrical stimulation rate, however, the degree of deformation of either SL or mitochondria was higher.

The present invention may be a system, a method, and/or a computer present system product. The computer present system product may include a computer readable storage medium (or media) having computer readable present system instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving a live video sequence comprising two or more image frames depicting a live mammalian cell;
    defining, in real-time, within said cell, at least one longitudinal line along a length dimension of said cell, and at least one transverse line along a width dimension of said cell;
    calculating, in real-time, with respect to each image frame in said video sequence, a fast Fourier transform (FFT) with respect to each of said at least one longitudinal and transverse lines;
    detecting peaks in each of said calculated FFTs; and
    determining, for every image frame in the video sequence, in real-time, with respect to said cell, one or more temporal changes in at least one of sarcomere length, mitochondrial length, and mitochondrial width, based, at least in part, on said detected peaks, thereby detecting mitochondrial contraction-relaxation cycles in said live mammalian cell.

2. The method of claim 1, wherein said calculating of said FFT comprises calculating a distance in frequency units between elements of an FFT vector.

3. The method of claim 1, wherein said defining comprises defining a plurality of said transverse lines, and wherein said calculating of said FFT comprises calculating an FFT with respect to a concatenation of all of said plurality of said transverse lines.

4. The method of claim 1, wherein said determining of said sarcomere length is based on said peaks detected within the frequency range of 1.8 µm-2.2 µm.

5. The method of claim 1, wherein said determining of said mitochondrial length and mitochondrial width is based on said peaks detected within the frequency range of 0.7 µm-1.1 µm.

6. The method of claim 1, wherein said mammalian cell is a cardiac muscle cell.

7. A system comprising:
    at least one hardware processor; and
    a non-transitory computer-readable storage medium having stored thereon program instructions, the program instructions executable by the at least one hardware processor to
    receive a live video sequence comprising two or more image frames depicting a live mammalian cell,
    define, in real-time, within said cell, at least one longitudinal line along a length dimension of said cell, and at least one transverse line along a width dimension o said cell,
    calculate, in real-time, with respect to each image frame in said video sequence, a fast Fourier transform (FFT) with respect to each of said at least one longitudinal and transverse lines,
    detect peaks in each of said calculated FFTs; and
    determine for every image frame in the video sequence, in real-time, with respect to said cell, one or more temporal changes in at least one of sarcomere length, mitochondrial length, and mitochondrial width, based, at least in part, on said detected peaks, thereby detecting mitochondrial contraction-relaxation cycles in said live mammalian cell.

8. The system of claim 7, wherein said calculating of said FFT comprises calculating a distance in frequency units between elements of an FFT vector.

9. The system of claim 7, wherein said defining comprises defining a plurality of said transverse lines, and wherein said calculating of said FFT comprises calculating an FFT with respect to a concatenation of all of said plurality of said transverse lines.

10. The system of claim 7, wherein said determining of said sarcomere length is based on said peaks detected within the frequency range of 1.8 µm-2.2 µm.

11. The system of claim 7, wherein said determining of said mitochondrial length and mitochondrial width is based on said peaks detected within the frequency range of 0.7 µm-1.1 µm.

12. The system of claim 7, wherein said mammalian cell is a cardiac muscle cell.

13. A computer program product comprising a non-transitory computer-readable storage medium having program instructions embodied therewith, the program instructions executable by at least one hardware processor to:

receive a live video sequence comprising two or more image frames depicting a live mammalian cell, define, in real-time, within said cell, at least one longitudinal line along a length dimension of said cell, and at least one transverse line along a width dimension o said cell, calculate, in real-time, with respect to each image frame in said video sequence, a fast Fourier transform (FFT) with respect to each of said at least one longitudinal and transverse lines, detect peaks in each of said calculated FFTs; and determine for every image frame in the video sequence, in real-time, with respect to said cell, one or more temporal changes in at least one of sarcomere length, mitochondrial length, and mitochondrial width, based, at least in part, on said detected peaks, thereby detecting mitochondrial contraction-relaxation cycles in said live mammalian cell.

14. The computer program product of claim 13, wherein said calculating of said FFT comprises calculating a distance in frequency units between elements of an FFT vector.

15. The computer program product of claim 13, wherein said defining comprises defining a plurality of said transverse lines, and wherein said calculating of said FFT comprises calculating an FFT with respect to a concatenation of all of said plurality of said transverse lines.

16. The computer program product of claim 13, wherein said determining of said sarcomere length is based on said peaks detected within the frequency range of 1.8 µm-2.2 µm.

17. The computer program product of claim 13, wherein said determining of said mitochondrial length and mitochondrial width is based on said peaks detected within the frequency range of 0.7 µm-1.1 µm.

* * * * *